June 30, 1959 W. GOSS ET AL 2,892,342
PLASTIC TESTING MACHINE
Filed Dec. 30, 1954
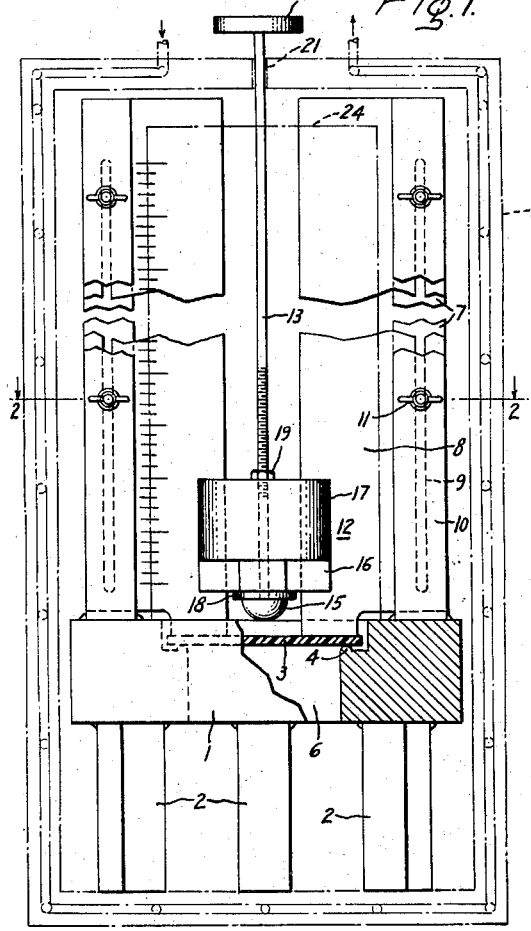
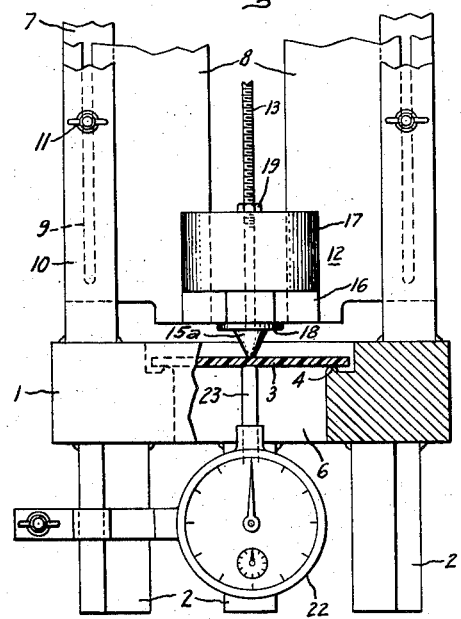
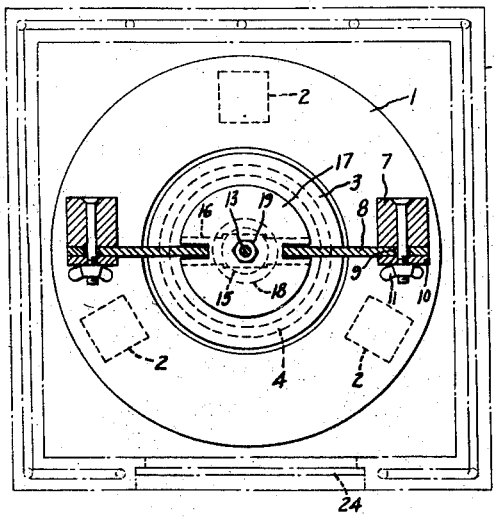
Inventors:
Wyman Goss,
Eliot R. Andrews,
by
Their Attorney.

United States Patent Office 2,892,342
Patented June 30, 1959

2,892,342
PLASTIC TESTING MACHINE

Wyman Goss and Eliot R. Andrews, Pittsfield, Mass., assignors to General Electric Company, a corporation of New York Application December 30, 1954, Serial No. 478,814

1 Claim. (Cl. 73—12)

This invention relates to apparatus for determining the fatigue strength, impact strength and hot rigidity of materials such as plastics.

Prior to the present invention machines utilizing "Izod" type test specimens were employed to determine the impact strength of materials such as plastics. Machines of this type usually consist of a weighted pendulum which is swung from a predetermined height so that it strikes a test specimen when traveling at its maximum velocity. This method is not entirely satisfactory for many reasons, among which is the reason that it does not indicate the amount of energy required to initiate fracture.

The present invention is an improvement over modified "Izod" type methods in which apparatus based on a falling weight is employed to determine both the fatigue strength and impact strength of plastics by measuring the energy necessary to initiate fracture of a standard "Izod" type specimen having a notch milled in its upper face. In this method of testing, the specimen is molded by standard procedure usually of the same dimensions and must be clamped in position during testing. Thus, it is not possible to test specimens of sundry shapes, for example, in the shape of the final molded product. Additionally, testing machines of this type are further limited in that they are not capable of measuring the hot rigidity of plastic specimens.

One of the objects of this invention is to provide a test machine or apparatus capable of determining the fatigue and impact strength of plastic specimens of varying thicknesses by measuring the energy necessary to initiate fracture thereof and the energy necessary to produce failure.

Another object is to provide a machine for determining the fatigue and impact strength of plastic materials in which means are provided for supporting the specimen being tested in a manner having the least tendency to affect the test results.

A further object is to provide a test machine or apparatus for testing the hot rigidity of plastic materials.

The above and further objects of the invention will be apparent from the following description taken in connection with the accompanying drawing in which Fig. 1 is a front view partly in elevation and partly in section, of an impact testing machine of the invention.

Fig. 2 is a section taken on line 2—2 of Fig. 1.

Fig. 3 is a fragmentary front elevation view, partly in section, of a modification of Fig. 1 showing a machine or tester primarily adapted for testing the hot rigidity of plastic specimens.

Referring more particularly to Fig. 1 of the drawing, the apparatus includes a base 1 constructed in the form of a hollow cylinder mounted on supports 2. The hollowed portion 6 extends through the base, the upper part being of wider diameter in order to receive a test specimen 3 usually in the form of a disk which is adapted to rest on narrow rim portion 4 formed integral with the inner wall of the narrower part of the hollowed portion of the base.

Two upright frame members 7 shown in the form of rectangular bars are mounted on the base 1. Guide members 8, marked off perpendicularly in inches, are each provided with an elongated slot 9 to permit vertical adjustment between the bars 7 and strips 10 by means of wing nut bolts 11. The lower end of each guide member may abut the test specimen when in place without exerting any direct weight thereon.

A carrier assembly 12, built on a threaded rod 13 and having a handle portion 14, includes a hemisphere 15 to serve as an instrument of percussion. Assembly 12 consists of a rectangular bar 16, slotted to follow guides 8, a spacer washer 18 situated between the percussion hemisphere 15 and the carrier bar 16, and a nut 19 to clamp riders rigidly in place.

Riders of various weight 17, in the form of cylindrical steel sections, may be used individually or collectively, slotted in conformance with the carrier bar so that when clamped to it the assembly will follow the guides loosely to the point of impact as an integral unit. Also included is a housing 20 for the apparatus which may be provided with heating or cooling means as required. Housing 20 has an opening 21 at the top thereof to receive rod 13. The housing enclosure 20 may also be provided with a window 24 so that the specimen may be observed and readings taken.

As illustrated in Fig. 3, the apparatus may be modified to provide means for testing the hot rigidity of plastics. This modification may also include a housing with appropriate heating means. In the embodiment shown in Fig. 3, a micrometer 22 is rotatably mounted on one of the support members and positioned so that plunger 23 is in direct contact with the plastic specimen.

While the principle of measuring the effect of a free falling weight on a specimen is not new, methods employing this principle heretofore have been in connection with standard "Izod" type specimens which cannot be made to approximate the desired molded article in shape or thickness. Additionally, the energy measurement is not believed to be accurate in view of energy losses due to the toss factor and mechanical friction.

For the first time, the present invention makes available a method of testing both impact and fatigue strength in which plastic specimens of various thicknesses and of sundry shapes may be tested by the application of small increments of force in an apparatus which offers unrestricted support of the specimen, simulation of actual impact conditions and negligible friction. These latter objectives are obtained by means of the rim 4 which is designed so as to support the specimen to offer the least possible area of contact therewith. In this manner, a floating effect is approximated in order to approach the ultimate accuracy in determining the energy required to produce incipient cracking and complete failure.

For determining the impact strength and the fatigue strength of plastic specimens, the testing machine of the invention is designed so that the carrier assembly 12 may be raised manually or mechanically to a desired height, measured by means of graduated guide members 8, and the weight guided by guides 8 allowed to drop so that the percussion hemisphere always strikes the specimen at the same point. The machine can be used to measure the fatigue strength in foot pounds by dropping a constant weight from a constant height until incipient cracking or outright failure occurs. The number of drops multiplied by the product of the height in feet times the weight in pounds employed gives the energy required in ft. lbs. Impact strength may be determined by sequentially increasing the height of fall of a constant weight by a constant distance and calculating the cumulative ft. lbs.

of energy required to produce incipient cracking or disintegration. This calculation may be made as follows:

$$S = \frac{N}{2}[2a + (N-1)d]$$

where:

$S$ = sum of N terms [1] in ft. lbs.
$N$ = number of blows
$a$ = force of first blow (ft. lbs.)
$d$ = constant increase of height in ft. lbs.

[1] Terms = number of blows.

The impact strengths of several general purpose phenolic plastic specimens were determined by sequentially increasing the height of fall of a constant weight by a constant distance. Three specimens, 4 inches in diameter and ⅛ inch thick, composed of (1) a phenolic resin with a wood-flour filler, (2) a rubber phenolic with an asbestos filler, and (3) a rubber phenolic with a rag filler were tested using ¼, ½ and 1 lb. weights, respectively. These tests were conducted by starting at an initial drop height of 1 inch and increasing the height sequentially by 1 inch increments until the first crack appeared. For each of the three specimens tested, incipient cracking appeared at a final drop height of 15″. The energy calculations for each of the specimens follow:

*Example 1.*—Test with ¼ lb. weight:

$$S = \frac{15}{2}\left[\frac{2}{48} + (14)\frac{1}{48}\right] = 2.5 \text{ ft. lbs.}$$

*Example 2.*—Test with ½ lb. weight:

$$S = \frac{15}{2}\left[\frac{2}{24} + (14)\frac{1}{48}\right] = 5.0 \text{ ft. lbs.}$$

*Example 3.*—Test with 1 lb. weight:

$$S = \frac{15}{2}\left[\frac{2}{12} + (14)\frac{1}{12}\right] = 10.0 \text{ ft. lbs.}$$

As disclosed earlier the fatigue strength of the plastic specimen may be determined by dropping a constant weight from a constant height until the first crack is observed. The energy required to produce this crack may then be calculated by simply multiplying the three factors. For example, the energy required to crack a specimen with a ½ lb. weight dropped from a distance of 1′ ft. ten times would be ½ × 1 × 10 = 5.0 ft. lbs.

The following examples, listed below in Table I, illustrate the use of the apparatus to measure the fatigue strength of plastic specimens. The same resin was employed in each of the specimens of Examples 7, 8 and 9 but the fillers used were three different grades of rag, identified as A, B and C, respectively. These examples further illustrate the adaptability of the apparatus to specimens of varying thicknesses. The energy required to produce cracking and complete failure may be readily calculated, as disclosed previously, by merely multiplying the number of drops by the height of fall by the weight employed.

*Table I*

| Specimen [1] | Disk Thickness Depth, inches | Drop Feet | Hammer Weight, Lbs. | Fatigue, No. of Drops | |
|---|---|---|---|---|---|
| | | | | Crack | Fall |
| Rubber-phenolic wood flour filler | .123 | 2 | ¼ | 10 | 44 |
| Rubber-phenolic rag filler | .170 | 2 | 1 | 67 | 304 |
| Laminate, Grade C | .062 | 2 | ¾ | 1 | 5 |
| Phenolic, rag filler A | .138 | 2 | ¾ | 3 | 8 |
| Phenolic, rag filler B | .143 | 2 | ¾ | 7 | 18 |
| Phenolic, rag filler C | .139 | 2 | ¾ | 8 | 124 |

[1] Specimen = 4″ diameter disks.

The present invention also offers a new, practical, systematic and precise method of testing the hot rigidity of plastic material. This characteristic has been determined in the past by several methods in which mere visual indications of this property are obtained. For example, one method previously employed merely involves squeezing a specimen disk by hand to get comparative hot rigidity characteristics and obviously can result only in very crude observations. Another method frequently used involves the clamping of a standard specimen disk onto a solid surface with half or two-thirds of the disk projecting over the edge of the solid surface. Weights are hung on the projected portion of the disk and the resulting degree of deflection measured. Since each of these methods is subject to the limitations of the persons performing the tests and since visual observations are at best based on individual opinion, results obtained by these methods obviously may vary from one tester to another and cannot always be relied upon to be accurate for subsequent samples of the same material.

Still another method of testing the hot rigidity of plastic materials is a so-called heat distortion test in which a 5″×½″×½″ bar specimen is molded, cooled to room temperature and then subjected to a standard ASTM heat distortion test which involves the procedure of placing the bar in a receptacle surrounded by oil, applying weights to the center of the bar and raising the temperature of the oil bath until the molded bar shows distortion under heat. This method is long and cumbersome since it involves the periods of cooling to room temperature and reheating to a distortion temperature. Additionally, since the specimen is rectangular and the weights are placed on its center, the measurement is actually limited to a measure of the parallel forces since the stress lines form a catenary.

The hot rigidity test which may be conducted by means of the apparatus of this invention permits of a new and practical method of accurately determining this property of hot plastic specimens. This is an important property of materials of this type and must be accurately determined in view of present molding methods. For example, in injection molding, the molded pieces must be capable of being removed from the mold at a temperature approximating the molding temperature, that is, at a relatively high temperature. In practice, so-called knockout pins eject the molded part and if the molded part is not sufficiently rigid at the temperature at which it is ejected, deformation will occur and inferior products will result. By the present method, it is possible accurately to determine this particular property for materials of varying compositions. In other words, it is possible to measure this property for a complete line of plastic materials and to assign these materials to end molding uses where this particular property is extremely important.

When employed to test the hot rigidity of plastic specimens, the apparatus of this invention modified in accordance with Fig. 3 is used so that micrometer 22, rotatably mounted on one of the leg members 2, is positioned with its pointer in direct contact with the under surface of a plastic disk specimen to be tested with the indicator of the micrometer zeroed as a starting position. In actual practice, a test specimen is removed from the mold and transferred to the tester as rapidly as possible. Temperature conditions during the test are maintained as close as possible to the molding temperature by means of the housing surrounding the apparatus. After a predetermined standardized period, for example, 15 seconds, the weight assembly 12 with its pointed contact 15a is lowered onto the specimen and after another standardized period, for example, at 30 second intervals, readings are taken. Specimens having the smallest deflection, that is, the lowest readings on the micrometer, have the best hot rigidity properties.

The weight applied in determining hot rigidity does not enter into the calculation of this property. However, it is important in establishing this particular property for the same line of plastic materials that in every test the same weight be applied in order to have standardized results. Similarly, the time interval between removing the specimen from the mold and applying the weight must be a constant for all specimens tested and the period between which such readings are taken must also be standardized and be constant for each reading.

The method of testing the hot rigidity of plastic specimens afforded by the apparatus herein described offers substantial advantages. For example, it permits the use of standard disk specimens as the testing specimens. Additionally, the apex of the applied weight distorts the disk into a conical form as a result of which the applied force is distributed proportionately and concentrically from the point of stress. Moreover, the disk permits of another dimension to be represented by a bending moment not measured by rectangular shapes whose stress lines form a catenary, as mentioned previously.

The following examples, listed below in Table II, are given to illustrate the use of the apparatus of this invention to determine the hot rigidity of plastic specimens. This may best be illustrated by employing as test specimens two similar phenolic resins having a wood flour filler, one having added thereto additional lime and additional iron oxide pigment and the other having neither of these additional additives. These specimens were selected for the purpose of determining whether or not the test results would show improved hot rigidity for the specimen containing the additives since these materials are commonly used for this purpose. In each of these tests, the specimens were removed from the mold and transferred to the apparatus as quickly as possible, the temperature within the housing being adjusted to approximate the molding temperature. Readings were taken at intervals of forty-five seconds, sixty seconds and ninety seconds, respectively.

Table II

| Example | Specimen [1] | Rigidity in Mils | | |
|---|---|---|---|---|
| | | 45 Sec. | 60 Sec. | 90 Sec. |
| 10 | phenolic, wood flour filler | 155 | 122 | 111 |
| 11 | phenolic, wood flour, lime and iron oxide additives. | 142 | 117 | 86 |

[1] Specimen=4" diameter disks.

The foregoing results show the expected improvement in hot rigidity of the specimen containing the additional lime and iron oxide. From this, it is evident that the test method is reliable and can be employed to give reliable results. It is also evident that by this method it is possible to establish and standardize this property for varying formulations and to assign products to end uses requiring a predetermined hot rigidity value. Examples 10 and 11 were repeated with similar disks with little or no variation in result.

When used to determine hot rigidity the apparatus of this invention makes possible a systematic method, heretofore not available of determining and standardizing this property for various formulations. Additionally, the advantages inherent in the apparatus when employed to determine impact strength and fatigue strength are substantial. One of the more important advantages is that smaller differences are detectable between the values of lots or types of products than with any other apparatus available. This may be attributed to the design of the apparatus, particularly the narrow rim employed to support the specimen, making possible the application of small increments of force which, coupled with unrestricted support of the specimen, results in negligible friction and simulation of nearly actual impact conditions. Other important advantages are the simplicity of the apparatus, its specific adaptability to plastics, its simple operation and low cost.

What we claim as new and desire to secure by Letters Patent of the United States is:

In a machine for testing the impact and fatigue strength of molded plastic material, means for supporting gravitationally a test specimen of plastic material comprising a recessed rim containing a raised annular portion substantially narrower than said rim and upon which said specimen is supported so that the upper surface and substantially the entire lower surface of the test specimen are free of contact with said supporting means while at the same time the specimen is confined in a relatively fixed position, a carrier assembly adapted to apply a variable load to said specimen, said carrier assembly comprising a terminal hemisphere for striking the specimen at a central portion thereof, said carrier assembly being freely movable in a vertical direction, means for guiding the carrier assembly so that the hemisphere strikes the test specimen at a point equidistant from its position of support and means integral with said guide means for measuring the height of fall of said carrier assembly.

References Cited in the file of this patent

UNITED STATES PATENTS

| | | |
|---|---|---|
| 1,071,430 | Keen | Aug. 26, 1913 |
| 1,498,659 | Jackson | June 24, 1924 |
| 1,709,638 | Thwing | Apr. 16, 1929 |
| 1,830,842 | Vercombe | Nov. 10, 1931 |
| 1,985,478 | Yuasa | Dec. 25, 1934 |
| 2,388,246 | Berger | Nov. 6, 1945 |
| 2,479,984 | Stock | Aug. 23, 1949 |
| 2,579,503 | Lubin | Dec. 23, 1951 |
| 2,748,596 | Tasker | June 5, 1956 |

FOREIGN PATENTS

| | | |
|---|---|---|
| 248,888 | Great Britain | Mar. 18, 1926 |